Feb. 6, 1962  A. R. BARRINGER  3,020,471
METHOD AND APPARATUS FOR THE DETECTION OF ORE BODIES
Filed June 16, 1958  4 Sheets-Sheet 1
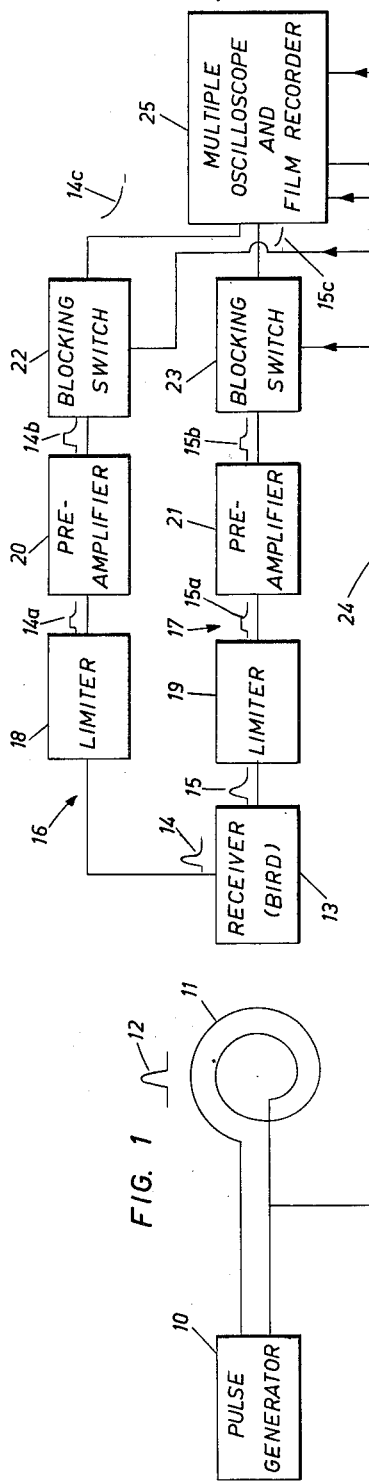
Inventor
ANTHONY R. BARRINGER

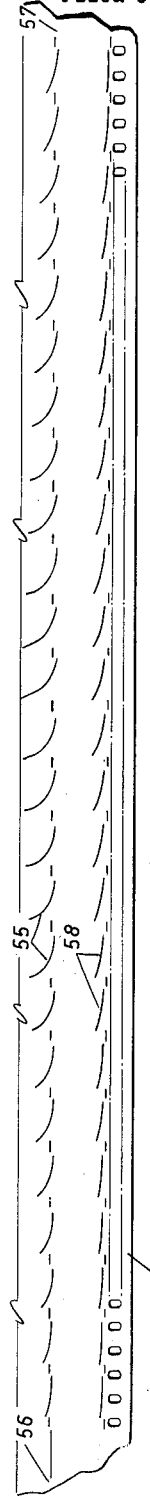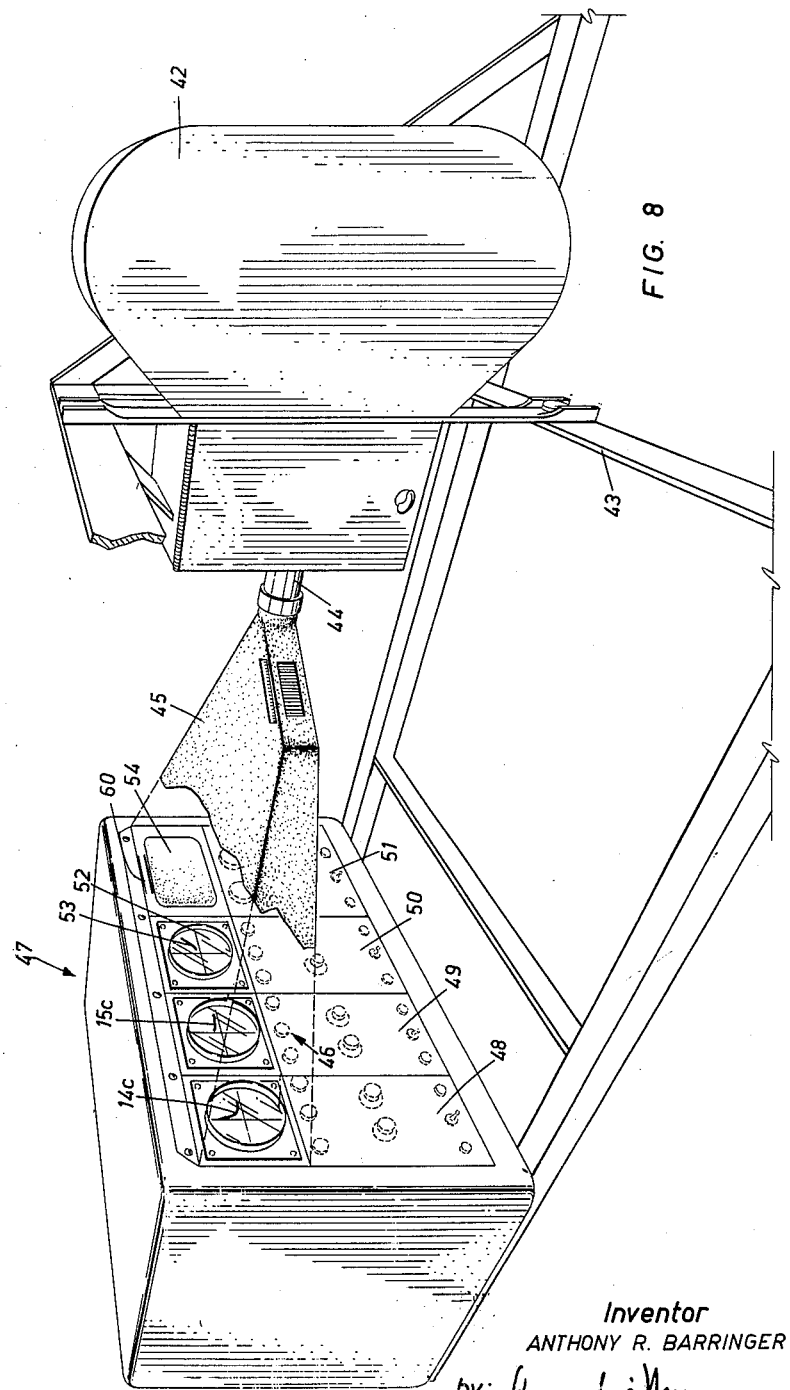

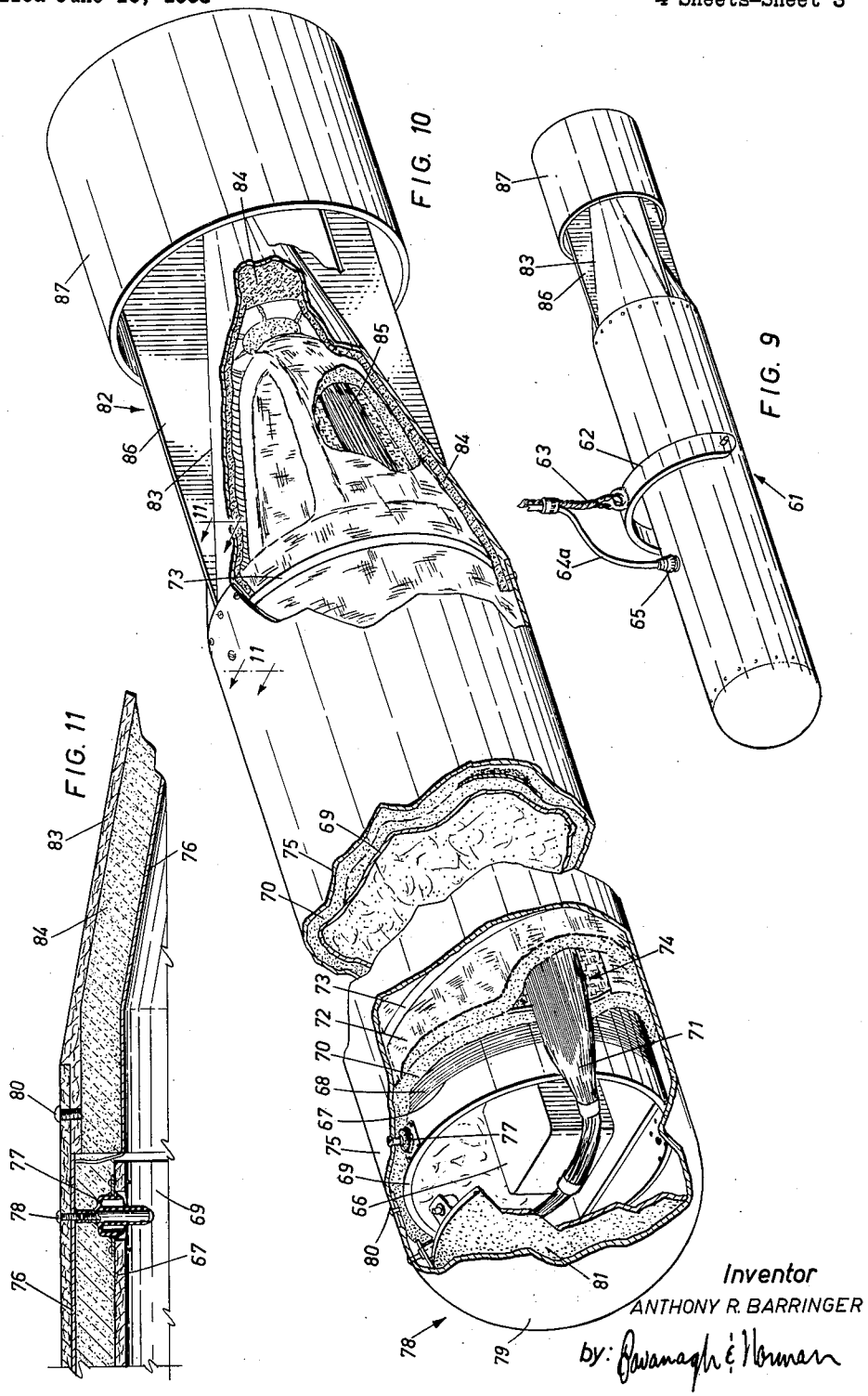

Feb. 6, 1962 A. R. BARRINGER 3,020,471
METHOD AND APPARATUS FOR THE DETECTION OF ORE BODIES
Filed June 16, 1958 4 Sheets-Sheet 4
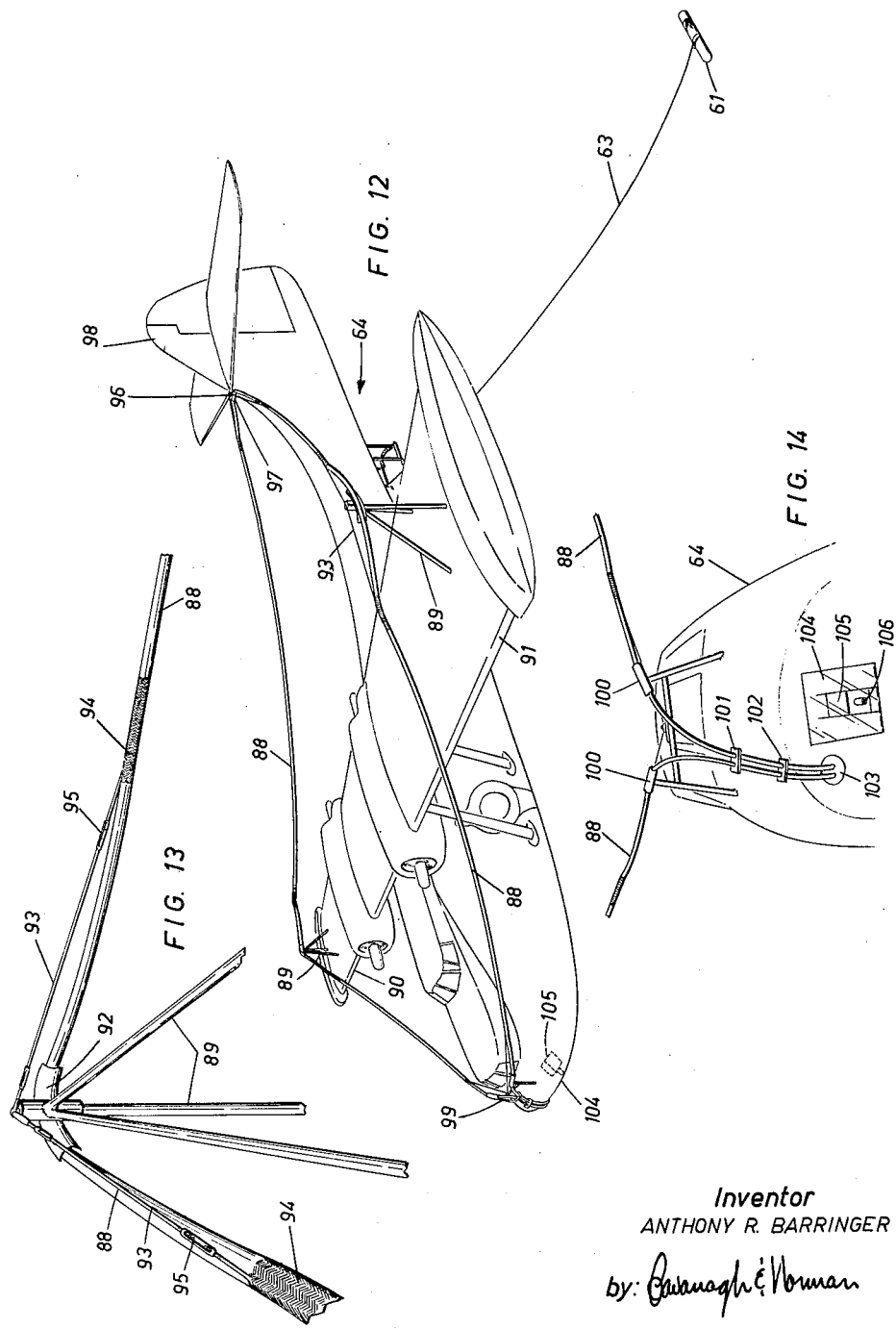
Inventor
ANTHONY R. BARRINGER
by: Cavanagh & Norman

United States Patent Office 3,020,471
Patented Feb. 6, 1962

3,020,471
METHOD AND APPARATUS FOR THE DETECTION OF ORE BODIES
Anthony René Barringer, Agincourt, Ontario, Canada, assignor to Barringer Research Limited
Filed June 16, 1958, Ser. No. 742,285
10 Claims. (Cl. 324—6)

This invention relates to a method and apparatus for the pulse excitation of ore bodies for detection of the latter by transient response of the ore body to pulse excitation.

The general aim of any geophysical or geochemical technique is to seek for mineral deposits by virtue of some anomalous feature which these deposits exhibit with respect to their surrounding host rocks. In particular, electrical methods utilize the fact that certain types of base metal deposits exhibit a conductivity which may be hundreds or even thousands of times higher than the conductivity of the enclosing rocks. Thus, any technique which is capable of detecting unusual changes of conductivity in the near surface rocks is one which has possibilities of use in the search for base metal deposits of the conducting type. Included in this conducting type are deposits which are comprised of massive sulphides or sulphide disseminations containing approximately twenty percent (20%) or more sulphides.

Electrical methods of prospecting can be divided into three main categories as follows:

(a) Self-potential methods which detect the presence of near surface or deposits by the electro-chemical potentials set up by oxidation of the upper portions of these ore deposits. Special electrodes are contacted with the ground in order to detect these potentials.

(b) Galvanic methods, employing electrodes to introduce currents into the ground and thereby measure changes in conductivity.

(c) Inductive methods which generate currents in conductive zones by exciting them with fluctuating electromagnetic fields, and which locate these conducting zones by detecting the presence of the secondary fields which the induced currents generate. Generally, inductive methods of geophysical prospecting are by far the most popular as they are relatively rapid and more flexible in use than galvanic or self-potential methods.

One of the disadvantages of ground geophysical techniques is the high cost and low speed of coverage when systematic survey on closed traverses is used for prospecting substantial blocks of country. Consequently, in recent years, increasing attention has been given to methods of inductively energizing and detecting conductive zones from the air. Using airborne methods costs can be reduced, and the productivity of one aircraft can be made equivalent to that of fifteen or more ground crews, depending upon circumstances and equipment.

Almost without exception, nearly all of the airborne electro-magnetic systems developed to date rely upon the airborne adaptation of a previously developed ground technique. A transmitter is used in the aircraft to generate audio frequency alternating electromagnetic fields of sufficient power to induce electrical currents in conducting zones which lie in the ground below the flight path of the aircraft. The aircraft generally flies at an altitude of five hundred feet and tows behind it a bird which contains the sensing element, normally a coil-type antenna. This coil detects the presence of conducting zones by picking up the secondary electromagnetic fields generated by the induced currents flowing in the conductive zone.

The principal limitation of airborne methods at present lies in the fact that the secondary fields radiated by conductors are thousands of times weaker than the primary field radiated by the aircraft for the purpose of energizing the conductors. Because pulses and time separation are not employed, these very weak secondary fields have to be detected in the presence of strong primary fields, a feat which involves the precision balancing out of the primary field by holding certain orientation relationships between the transmitting and receiving coils and by further electronic balancing of the signals. While such methods are relatively easy on the ground, they become very difficult in the air, since a bird, towed behind an aircraft, is never completely stable, and tends to become very unstable in rough or bumpy weather. Any movement of the bird tends to introduce misorientation electrical noise into the receiving system which prevents the detection of small signals and thus limits the sensitivity of the system. It is important to note that this movement of the bird places the final limitation on the sensitivity of present-day airborne electromagnetic systems, and it is useless to increase transmitted power beyond a certain point, since such increase simply magnifies the misorientation noise level in the bird, and therefore does not improve the all-important signal to noise ratio.

Two or three systems in use today employ rigidly mounted transmitter and receiver coils mounted on the wing tips of fixed-wing aircraft, or fore and aft of a helicopter on special booms. These systems still suffer from misorientation noise introduced by vibration, since the problems of stability are inversely related to the cube of the distance separating the transmitter and receiver. With separations of sixty feet or less vibration problems can become acute and are impossible to eliminate entirely.

In contrast to the foregoing, the system of this invention employs a high powered pulse of a million watts or more generated two or three times per second. These pulses, which flow in a very large loop around the aircraft, radiate powerful electromagnetic fields which in turn induce pulses of circulating currents in underlying conductive zones. These induced current pulses continue to flow for a short period after the energizing pulses have been terminated, the current gradually decreasing to zero. This phenomenon is called a transient effect and the lagging current transient effect is accompanied by a similar effect in the associated secondary electromagnetic field generated by the induced currents. Thus the conductive zone is said to have a transient response to an energizing, pulse type electromagnetic field, and this transient response lags in time behind the energizing pulse. Thus, according to the invention, the transient secondary electromagnetic field may be measured without the presence of an over-riding primary field. By this means numerous possibilities become available for increasing the sensitivity of airborne methods and of making various new types of measurement as a further aid to the identification of characteristics of the conductive zones located from the air.

With regard to the foregoing, it is the main object of this invention to provide a method and apparatus, and in particular a system, for obtaining information concerning the characteristics of an ore body in which the ore body is energized as a conductor with an electrical current, thereby to generate an electro-magnetic field in the conductor adapted to radiate therefrom, and in such manner that the energizing of the conductor is abruptly terminated to provide a collapse of the electro-magnetic field in the conductor, whereby the collapsing characteristic of the magnetic field may be detected and measured to determine characteristics thereof, thereby to obtain information concerning the nature of the conductor and the ore body which it defines.

It is a further object of the invention to provide a method and apparatus in a novel system of aerial prospecting in which the boundaries and angular relationship of an ore body may be determined.

It is a still further object of the invention to provide a method and apparatus for a novel airborne geophysical prospecting system in which the transient response of a plurality of conductors defining corresponding ore bodies in adjacent relationship may be detected in such manner as to obtain substantial information concerning the relationship and location thereof.

Other objects of the invention will be apparent from a study of the following specification, taken in conjunction with the accompanying drawing.

In the drawings:

FIGURE 1 is an electrical block diagram of the system of the invention;

FIGURE 2 is an electrical schematic of the pulse generator of the system of FIGURE 1;

FIGURE 3 illustrates an ideal transmitted pulse form according to the invention;

FIGURE 4 represents the transient response of a natural conductor to a current pulse induced therein when the current pulse is of the form of FIGURE 3, it being understood that only that portion of the transient response existing after termination of the induced current pulse is defined herein as the transient response portion;

FIGURE 5 represents a transient response of opposite phase to that of FIGURE 4 obtainable from a different orientation of the transmitter loop and receiving coil loop relative to the conductor or ore body being examined;

FIGURE 6 is a transient response diagram typical of a response curve obtained according to the invention from a natural conductor, and indicating the exponential nature of the curved form in which the time constant Tc corresponds to a time interval of one third peak amplitude thereof;

FIGURE 7 represents a portion of a thirty-five millimetre film strip showing transient response curves thereon obtained by horizontal and vertical receiving coils respectively upon traversing a substantially horizontal conductor on a predetermined flight path during an aerial survey;

FIGURE 8 is a perspective view of one suitable form of multiple oscilloscope and film recorder apparatus useful in practice of the invention;

FIGURE 9 is a perspective view of a receiving coil bird according to the invention;

FIGURE 10 is an enlarged view of the bird of FIGURE 9 partially broken away to reveal details of the construction thereof and orientation of horizontal and vertical receiving coils therein;

FIGURE 11 is a sectional view at 11—11 of FIGURE 10;

FIGURE 12 is a perspective view of an aircraft carrying the apparatus of the invention illustrating the nature of the loop radiator thereon;

FIGURE 13 is a perspective detail of the wing end support connection for the loop radiator of FIGURE 12;

FIGURE 14 is a partial front end view of the aircraft of FIGURE 12 revealing the nature of lead in connections for the loop radiator thereon.

Referring to the drawings, the general system of the invention is illustrated in FIGURE 1, and comprises a pulse generator 10 adapted to provide a short powerful electro-magnetic pulse of energy preferably of the order of two milliseconds duration of half sine wave form of the order of one million watts power. The generated pulses may be spaced about one second apart in time at regular spacing, or may be generated at intervals corresponding to a predetermined distance interval along the flight path of the aircraft carrying the pulse generator and other equipment to be described.

The pulse generator 10 is adapted to energize the radiator loop 11 provided in the form of a six wire rubber insulated cable in which the wire ends are connected electrically in series to provide eight hundred (800) amperes turns in the instant example. The pulse 12 of radiated energy is emitted by the radiator 11 in at least one directional sense at right angles to a theoretical plane containing the wires of the radiator 11. The radiator is therefore disposed substantially horizontally, as will be disclosed in more detail herein after. Responsive to energizing pulses the large loop radiator around the aircraft radiates powerful electro-magnetic fields which in turn induce pulses of circulating currents in underlying conductive zones defined by natural conductors comprising, for example, an ore body. The current pulses induced in the conductor continue the flow for a short period of time after termination of the energizing electro-magnetic field pulse. This phenomenon is called a transient current effect within with which there is an associated secondary electro-magnetic field generated by the induced currents and having a corresponding transient characteristic. Thus the secondary electro-magnetic field response of a conductor is of transient nature and lacks the energizing pulse. According to the invention, the transient secondary electro-magnetic field is measured in such manner that the primary electromagnetic field pulse transmitted by the radiator 11 is eliminated to enable measurement of the transient portion alone of secondary electro magnetic field.

The secondary field detector carried by the aircraft is illustrated in block diagram form in the right hand portion of FIGURE 1, and comprises a receiver 13 preferably contained in a trailing bird, to be described hereinafter, adapted to detect vertical and horizontal components of the secondary electro-magnetic field radiated from a conductor, thereby providing, by way of example, a horizontal signal wave form 14 and a vertical wave form signal 15. These separately detected or sensed fields provide these corresponding signal wave forms handled in independent horizontal and vertical signal channels 16 and 17 respectively. In order to avoid overloading of following electronic circuitry some conventional clipping and/or limiting device 18 and 19 may be employed to avoid blocking of signal handling due to an over riding high intensity primary field signal. It will be appreciated that even though the collapse of the secondary field lags behind the termination of the primary field, this dipping and/or limiting function is of importance in the elimination of residuary oscillations in the receiver 13 which may be induced by the termination of the primary field and would otherwise tend to block the signal. The clipped wave forms 14a and 15a are amplified by suitable preamplifiers 20 and 21 to the forms 14b and 15b. The signal in each of the channels is blocked during the time interval of the primary field electro-magnetic pulse by an electronic blocking switch 22 and 23 whereby the transient portion only of the signal wave forms pass therethrough to provide the transient wave forms 14c and 15c. The blocking switches 22 and 23 operate directly responsive to the signal from the pulse generator 10 by way of signal communicating line 24. The resulting transient signals 14c and 15c are preferably displayed according to the invention in a multiple oscilloscope and film recorder unit 25, shown in more detail in FIGURE 8.

It is the purpose of the recorder unit 25 to provide a separate record of horizontal and vertical transient response of natural conductors. The unit may incorporate altimeter information from an altimeter 26 as well as a pictorial view of the ground being surveyed from a television pick-up unit 27.

The preferred form of pulse generator according to the invention is illustrated in FIGURE 2 and embodies any suitable electronic input 28 adapted to provide a triggering pulse on the grid 29 of thyratron 30 at time measured intervals of say one second, one half second, one third second, or the like, depending upon the duty cycle permissible in the pulse generating equipment provided. The invention also contemplates that the trigger input device may subject a triggering pulse to the grid 29 at predetermined points of measured distance of the aircraft along a flight path over ground surface being surveyed. In either event, a triggering pulse effects conduction through the thyratron 30 developing a large current pulse energizing the radiator coil 11 of an inductance in relation to the series load capacitor 31 therefore developing a maximum Q for the pulse length desired. The response of the LC network is of substantially sine wave form in which harmonics and negative portions must be eliminated to leave only a single positive half sine wave pulse of energy. This may be accomplished by providing heavy damping of the coil 11 by resistor 32 electrically in parallel with the latter, and by grounding negative positions of the pulse through the negative going gas diode 33 effectively shorting negative portions of the pulse wave form to ground. A bleed-off resistor 34 in parallel with condenser bank 31 to ground, permits a bleeding off of any remaining charge in the LC circuit after termination of the initial pulse of energy. The resulting pulse form is designated by numeral 12 in FIGURE 3 having a time base $t$ preferably of the order of one half second and of a maximum current amplitude of the order of three hundred amperes.

FIGURE 4 illustrates the electro-magnetic transient response of a conductor to the pulse 12. The entire response curve being indicated by the numeral 35, the chain line portion 36 thereof being removed by the blocking switches of FIGURE 1 to leave the full line transient signal portion 37 representative of the transient response of the conductor. FIGURE 4 therefore represents the duplicate signal received from a horizontal conductor wherein the portion 37 would appear on the recorded film of the recorder 25. The electro-magnetic response curve 38 of FIGURE 5 is of opposite phase to that of FIGURE 4, and has a response curve portion 39 which is positive going, being typical of the vertical co-ordinate of response of secondary field from an underground conductor when the flight path of the aircraft is in the same direction as the motion of the detected component of secondary electro-magnetic field emanating from the conductor. It will therefore be apparent that there is a directional characteristic in the information obtained, having regard to the relative orientation of the radiator coil 11, the receiving coils of the receiver, the natural conductor or conductors being energized, and the direction of flight path.

FIGURE 6 is a diagrammatic illustration of a typical transient response curve 40 in which A is the maximum amplitude, and the lower case letter $a$ is the amplitude defining the Tc of the transient response. The curve 40 will generally be of exponential form, and accordingly the value "$a$" will be approximately one third of maximum amplitude A. The point of maximum amplitude occurs at the beginning of the transient occurring at the line 41 corresponding to the line of termination in time designated by the same numeral in FIGURES 3, 4 and 5.

In practical embodiment the recording system 25 of FIGURE 1 may be of the form illustrated in FIGURE 8 in which a thirty-five millimeter camera 42 of conventional construction is provided on a fixed frame 43 carried within the aircraft. The camera 42 is of a kind embodying no shutter element so that the film thereon (not shown) passes behind the lens system 44 at a continuous speed. Lens system 44 is connected by an enclosure 45 to an array of cathode ray tube screens 46 displayed by the multiple oscilloscope apparatus 47 comprising a plurality of oscilloscopes 48, 49 and 50, including one or more television receiver picture display devices 51. Oscilloscopes 48, by way of example, may display the curve 14c of FIGURE 1, oscilloscope 49 may display the curve 15c, oscilloscope 50 is preferably connected in such manner that two of the deflection plates of the cathode ray tube 52 thereof are sensitive to signal 14c and the other two deflection plates thereof at ninety degrees to the first two are responsive to the signal 15c, whereby a vector or combined signal curve 53 is displayed. The television picture tube screen 54 may display a picture of the ground over which the aircraft is flying along the flight path.

A film strip made with apparatus similar to that of FIGURE 8 was obtained from response of a horizontal conductor, and showed both a horizontal and vertical transient response. FIGURE 7 represents an enlarged copy of the film strip obtained over the particular conductor, and shows a series of horizontal transient response curves 55 of maximum amplitude between the ends of the series representative of a definition of the physical extent of the conductor, as the total length of the series of curves from the point 56 to the point 57 represents physical distance along the ground surface. The series of curves 58 represent vertical transient response of the same conductor responsive to the same transmitted pulses as the curves 55. The film strip 59 may also carry additional information such as a series of vector representations 53 as desired. It is not necessary to provide any shutter in the camera 42 for the reason that the pulses of energy giving rise to the curves 55 and 58 are of short duration. It is then merely necessary to cause the film speed of the camera 42 to be in direct relation to the speed of the aircraft. One simple way of accomplishing this is to set the camera at a predetermined speed, and then to make the flight run at a predetermined ground speed, so that a length of film will represent a predetermined distance over the ground surface on the flight path. The utilization of a television picture tube 54 may, in any case, eliminate the necessity for establishing a predetermined flight speed, since a picture representation on the film strip 59 of the ground covered will enable an examination of the photographs of the terrain covered to determine the actual length of the flight path for which corresponding response curves are shown. The apparatus 47 may also incorporate a digital display of numbers on a suitable dial or numerical display device 60 indicating elevation. It will be obvious that additional further information concerning flight speed, clearance height or other data may be displayed for recording on the film of camera 42 automatically during flight in synchronism with the recording of transient response information as described. In the recording of all such additional information it will be necessary to cause lighting thereof or display thereof responsive to transmitted pulses, in such manner that, during transmission of a pulse, all such additional information is not displayed, and during the time interval between transmitted pulses such additional information is displayed or lighted, that is during the display of a transient response curve, thereby to achieve a shutter effect.

FIGURES 9 to 11 disclose a transient response signal receiving bird according to the invention, in which it will be apparent that the bird housing 61 is adapted to be suspended by conventional pivotal suspension bracket 62 connected by a reelable cable 63 to a reel-up drum (not shown) within the aircraft 64 shown in FIGURE 12. An electrical signal communicating cable 64a is connected by a suitable fitting 65 to an interior electronic circuitry within an internal housing 66 (FIGURE 10) preferably embodying a circuitry of the receiver, limiter, and preamplifier of FIGURE 1. The interior of the bird construction embodies a so-called horizontal coil 67 in the form of a single layer winding 68 on tubular core 69. The horizontal coil is insulated both electrically and against shock by a padding layer 70 of glass fibres or the like. A so-called vertical coil 71 is then wound laterally over the coils 68 and insulation 70 for the purpose of sensing vertical co-ordinates of a secondary field response of a conductor. A further layer 72 of glass fibre insulation overlies the winding 71 and insulation 70, said windings and insulation being taped by suitable taping 73, the thus described construction of horizontal and vertical coils, with their insulation, being hereinafter referred to as a coil structure 74. An outer tubular housing of resin bonded glass fibres, designated by numeral 75, has cemented into the inner surface thereof a split lining of metal sheet 76 for the purpose of defining a Farraday shield, as hereinafter described in more detail, and within which the coil structure 74 is supported by means 77 of conventional construction detailed in FIGURE 11, and connected by screws 78 to housing 75 and to the coil support tube 69. The nose assembly 78 of the bird comprises a somewhat hemispherical shell 79, fastened by suitable rivets 80 to housing 75. If desired, a suitable weight 81 in the form of resin-bonded red lead oxide or the like may be embodied in the nose structure 79 for balance purposes. The tail structure 82 of the bird comprises a tapered cone-like portion 83, formed of resin bonded glass fibres, and carrying therewithin gypsum plaster filling 84 defining a support for a rearward portion 85 of the vertical coil 71. The tapered structure 83 supports the rearwardly directed stabilizing fins 86 connected rigidly to stabilizing tube 87, whereby to maintain the bird on a desired flight path, at an elevation determined by the aircraft and the extension of suspending cable 63, as shown in FIGURE 12.

The aircraft 64 carrying the apparatus and system of the invention provides for a large enclosed area for the radiator loop 88, being the radiator 11 of FIGURE 1. A rigid tripod structure 89 is firmly fastened structurally near the ends of the wings 90 and 91, and provides a supporting bracket 92 for the loop cable 88. The latter is retained in supported position on bracket 92 by means of tensioning device 93 embodying a flexible expansible sleeve 94 adapted to contract in diameter when expanded lengthwise due to tension. By this simple means a turn buckle 95 may be utilized for securely tensioning the cable. The rearward apex 96 of cable 88 is anchored as at 97 to tail structure 98 of the aircraft. The forward ends 99 of the cable 88 are passed through supporting tubular anchorages 100 and communicated in spacing supports 101 and 102 through a forward insulating fitting in the nose portion 103 of the aircraft to interior utilizing circuitry. As shown in FIGURE 14, the aircraft may embody a forward hatch 104 adapted for positioning of a television camera 105 utilized as previously described, carrying lens 106.

It is intended that the present disclosure should not be construed in a sense limiting other than that indicated by the scope of the following claims having regard to the state of the art.

What I claim as my invention is:

1. A method of obtaining information concerning the characteristics of an ore body, comprising the steps of: establishing a primary electro-magnetic field emanating from a source remote from said ore body, a portion at least of said field encompassing a portion of said ore body and inducing a secondary electro-magnetic field therearound; abruptly terminating said primary field thereby to induce a transient collapse of said secondary electro-magnetic field around said ore body delayed a short time after said termination of said primary field; detecting and receiving said delayed transient collapse of said secondary electro-magnetic field during the absence of said primary electro-magnetic field by means of receiving apparatus, while said apparatus is exhibiting at least a minor degree of vibrating or other motion relative to said primary field source, and measuring the characteristics of said transient collapse to obtain information concerning said ore body.

2. The method according to claim 1 in which the secondary electro-magnetic field is induced in the ore body by subjecting the same to radiation by short, powerful pulses of electrical energy, each of the order of about one million watts, for about two milliseconds duration and at a repetition rate of the order of about two pulses per second.

3. The method according to claim 1 in which the said secondary electromagnetic field is induced in said ore body by subjecting the same to radiation by short, powerful pulses of electrical energy, each of the order of about one million watts for about two milliseconds duration and at a repetition rate of the order of about two pulses per second; and in which said transient collapse of said secondary electro-magnetic field is measured substantially only during the time interval existing between said pulses thereby to obtain the transient response of the ore body to said primary electro-magnetic field.

4. The method according to claim 1 wherein said source of primary field and said receiver apparatus are in motion both in relation to the ground and relative to one another.

5. A method of air-borne surveying for obtaining information concerning the characteristics of an ore body located in the earth's surface comprising the steps of: establishing a primary electro-magnetic field emanating from a source carried by an aircraft, a portion at least of said field encompassing a portion of said ore body and inducing a secondary electro-magnetic field therearound; abruptly terminating said primary field thereby to induce a transient collapse of said secondary electro-magnetic field around said ore body delayed a short time after said termination of said primary field; detecting and receiving said delayed transient collapse of said secondary electro-magnetic field during the absence of said primary field by means of receiving apparatus carried by an aircraft while said apparatus is exhibiting at least a minor degree of motion relative to said primary field source, and measuring the characteristics of said transient collapse to obtain information concerning said ore body.

6. Survey apparatus for detecting the presence of a conductor from a point remote therefrom comprising in combination: pulse generating means operable intermittently at a frequency below radio frequency to establish a primary electro-magnetic field of sufficient magnitude at least to encompass at least a portion of said conductor and establish a secondary electro-magnetic field therearound; means operable to abruptly terminate said pulse and procure a rapid collapse of said primary field, said collapse of said primary field in turn inducing a resultant transient collapse of said secondary field around said conductor delayed a short time after said collapse of said primary field; detector and receiver apparatus responsive whilst exhibiting at least a minor degree of motion to said collapse of said primary and secondary electro-magnetic fields to provide respective primary and secondary signals; blocking means operable intermittently to block said primary signal and to pass said secondary signal; and measuring apparatus associated with said receiver and responsive to said secondary signal to provide information concerning said conductor.

7. The apparatus as claimed in claim 6, in which said source of a primary field includes: means for generating an electrical pulse of the order of one million watts of energy of about three hundred ampere current and of a duration of the order of about two milliseconds; and a radiator of the loop type for radiating the energy of said pulse.

8. The apparatus as claimed in claim 6, including sensing coils set in planes at right angles to one another, forming part of said detector and receiver apparatus.

9. The apparatus as claimed in claim 6 wherein said primary field source and said detector and receiver apparatus are movable both in relation to said conductor and relative to one another during operation.

10. Survey apparatus for use from an airplane in detecting the presence of a conductor located in the earth's surface, comprising in combination: pulse generating means carried by said airplane and operable intermittently at a frequency below radio frequency to establish a primary electro-magnetic field of sufficient magnitude at least to encompass at least a portion of said conductor and establish a secondary electro-magnetic field therearound; means operable to abruptly terminate said pulse and procure a rapid collapse of said primary field in turn inducing a resultant transient collapse of said secondary field delayed a short time after said collapse of said primary field; detector and receiver apparatus carried by said airplane responsive to said collapse of said primary and secondary fields to provide respective primary and secondary signals; blocking means operable intermittently to block said primary signal and to pass said secondary signal; and measuring apparatus associated with said receiver and responsive to said secondary signal to provide information concerning said conductor.

References Cited in the file of this patent

UNITED STATES PATENTS

| | | |
|---|---|---|
| Re. 24,464 | Yost | Apr. 22, 1958 |
| 2,636,924 | Lundberg et al. | Apr. 28, 1953 |
| 2,657,380 | Donaldson | Oct. 27, 1953 |
| 2,660,703 | Herbold | Nov. 24, 1953 |
| 2,710,351 | Lebacqz | June 7, 1955 |
| 2,735,980 | Wait | Feb. 21, 1956 |
| 2,931,973 | Puranen | Apr. 5, 1960 |